(12) United States Patent
Kimball et al.

(10) Patent No.: US 8,764,065 B2
(45) Date of Patent: Jul. 1, 2014

(54) SKATE SHOE APPARATUS AND METHOD OF MANUFACTURE

(75) Inventors: Douglas L. Kimball, Holden, MA (US); Christopher D. Favreau, Southbridge, MA (US); Linda B. McGinley, North Brookfield, MA (US)

(73) Assignee: Skaboots International, LLC, Paxton, MA (US)

( * ) Notice: Subject to any disclaimer, the term of this patent is extended or adjusted under 35 U.S.C. 154(b) by 155 days.

(21) Appl. No.: 13/110,445

(22) Filed: May 18, 2011

(65) Prior Publication Data

US 2011/0221180 A1    Sep. 15, 2011

Related U.S. Application Data

(63) Continuation of application No. PCT/US2009/065218, filed on Nov. 19, 2009.

(60) Provisional application No. 61/199,858, filed on Nov. 21, 2008.

(51) Int. Cl.
*A63C 3/12* (2006.01)

(52) U.S. Cl.
USPC ........................................... 280/811

(58) Field of Classification Search
USPC ............ 280/11.12, 600, 11.18, 809, 811, 825
See application file for complete search history.

(56) References Cited

U.S. PATENT DOCUMENTS

| | | | | |
|---|---|---|---|---|
| 1,210,224 | A * | 12/1916 | Silk | 280/825 |
| 1,788,433 | A * | 1/1931 | Alfred | 280/825 |
| 2,155,472 | A * | 4/1939 | Colbert | 280/825 |
| 5,941,568 | A * | 8/1999 | White, II | 280/825 |
| 2011/0079995 | A1* | 4/2011 | Hirano et al. | 280/825 |

* cited by examiner

*Primary Examiner* — Jeffrey J Restifo
*Assistant Examiner* — Erez Gurari
(74) *Attorney, Agent, or Firm* — Chapin IP Law, LLC

(57) ABSTRACT

A skate shoe apparatus may be used with a skate (e.g., an ice skate, a traditional roller skate or an inline skate) to provide a walking surface for a skater resembling that of a shoe or boot. The skate shoe apparatus includes a channel to receive a lower travel surface of a skate and support members to provide support (e.g., lateral support) for the skate and distribute lateral forces produced by the skate across the skate shoe apparatus. Additionally, the skate shoe apparatus prevents damage to the travel surface of a skate and increased safety when a skater wearing the skate walks on non-skating surfaces (e.g., walking in ice skates from a dressing area to the ice or across a parking lot to an arena or walking in traditional roller skates or inline skates in a store or restaurant).

17 Claims, 11 Drawing Sheets

Providing a skate shoe apparatus mold, the skate shoe apparatus mold for forming the skate shoe apparatus including a base portion having a top side, a bottom side, a left side and a right side, at least one channel wall extending from the top side of the base portion, the at least one channel wall defining a channel to receive a lower travel surface of a skate, and at least one support member extending from an upper region of the at least channel wall to the top surface of the base portion

1010

Injection-molding a material into the mold to form the skate shoe apparatus

SKATE SHOE APPARATUS AND METHOD OF MANUFACTURE

CROSS REFERENCE TO RELATED APPLICATIONS

This Patent Application claims priority to International Application PCT/US2009/065218 filed on Nov. 19, 2009 which claims priority to Provisional Application No. 61/199,858 filed on Nov. 21, 2008, the contents and teachings of which are hereby incorporated by reference in their entirety.

BACKGROUND OF THE INVENTION

Ice skates, including hockey skates, speed skates, figure skates and other types of skates, include boots with metal blades attached to the bottom, used to propel oneself across an ice surface. The metal blades have sharp edges. However, poor maintenance practices, such as improper or inconsistent sharpening, and damage from, for example, misuse, can often result in poor edge quality. Such damage can be caused by a blade coming in contact with a surface other than ice. These "bad" edges can have a significant effect on skating ability. Further, other types of skates, including roller skates and inline skates, include boots with wheels attached to the bottom. Although these wheels are not damaged as easily as ice skate blades, they may not be appropriate for all surfaces or all situations.

SUMMARY OF THE INVENTION

It is common for ice skaters to walk on surfaces other than ice while wearing skates, such as the rubber floor surfacing leading from dressing areas, which may be a considerable distance away. As another example, someone skating on a pond or other outdoor skating surface may walk in their skates from a car, warming hut or other location to and from the edge of the ice while wearing skates. Walking in skates over these various non-ice surfaces can be hazardous to the blades and may cause damage to them, such as nicks and dulling, thereby making the blades less effective. Further, the reduced surface area offered by the skate blade or a traditional narrow skate guard, in comparison to the width of a boot of the skate or other shoe, fails to provide adequate stability for the person and could potentially lead to injury. For example, the minimal surface area of the lower travel surface of an ice skate blade or an ice skate blade within a conventional blade guard provides little to no lateral support, which could lead to serious ankle injuries for a skater.

In order to prevent damage to ice skate blades, skaters typically use a covering device to protect the blades from damage. Existing devices for protecting skate travel surfaces provide a narrow cover that slips over and is secured to the skate. Although such devices do prevent damage to ice skate blades, the devices are not ideal for walking great distances in skates. Conventional blade guards are not much wider than the blade of the skate, thus providing little lateral or side-to-side support for the person wearing the skates.

Embodiments disclosed herein are directed to a skate shoe apparatus and may be provided for ice skates, such as hockey skates, figure skates and speed skates, and/or roller skates, such as traditional roller skates or inline skates. The skate shoe apparatus prevents damage to the travel surface of an ice skate when an ice skater wearing the skate walks on non-skating surfaces (e.g., walking in ice skates from a dressing area to the ice or across a parking lot to an arena or walking in traditional roller skates or inline skates in a store or restaurant). Further, the skate shoe apparatus is shaped to promote stability and ease of walkability while wearing skates.

The skate shoe apparatus includes a base portion having a top side, a bottom side, a left side and a right side and at least one channel wall extending from the top side of the base portion. The channel wall(s) (e.g. a left and right wall on a single skate shoe) define(s) a channel to receive a lower travel surface of a skate (e.g. such as the blade of an ice skate). The skate shoe includes at least one support member such as a strut or a brace extending from an upper region of the channel wall(s) to the top surface of the base portion. A tread may be defined on the bottom side of the base portion, thereby providing a gripping surface for traction of the base portion on a ground surface. The base portion, the channel wall, and the tread may be constructed from a common molded material and may be integrally formed with each other. The common molded material may be a rubberized material, a semi-flexible polymer material, and a solid material.

The channel walls may include a left channel wall and a right channel wall, with the left and right channel walls having inner sides spaced apart at a distance defining the slot to receive the lower travel surface of the skate. Further, a thickness of the channel wall may provide lateral rigidity for the skate. Moreover, the support members may be triangularly shaped, such that the hypotenuse of a triangle formed by the support member with the at least one channel wall and the base portion extends from the upper region of the at least one channel wall to an outer region of the top surface of the base portion, the base of the triangle extends laterally along the top surface of the base portion from an intersection of a lower region of the at least one channel wall and an inner region of the top surface of the base portion to the outer region of the top surface of the base portion, and the height of the triangle extends along the at least one channel wall from the upper region of the at least one channel wall to the intersection of the lower region of the at least one channel wall and the inner region of the top surface of the base portion.

The base portion may have a width that is substantially equivalent to the width of a boot of a skate. Further a density of support members may be greater at a center region of the base portion. Additionally, drain holes may be provided in the base portion under he channel. In other embodiments, a shank may be disposed in the base portion providing rigidity.

Further, the tread defined on the bottom side of the base portion may include lugs to provide added traction, and the tread defined on the bottom side of the base portion may be curved at a toe and a heel of the tread.

Moreover, an attachment device may be provided for securing the skate shoe apparatus to a skate. The attachment device may include a strap, and the strap may pass through a slot in the base portion or through a hole in the skate above the lower travel surface of the skate. In other embodiments, the attachment device may include spring bands extending over the lower travel surface of the skate.

Other embodiments include a method of manufacturing a skate shoe apparatus, such as by molding a material into a mold to form the skate shoe apparatus as described above.

BRIEF DESCRIPTION OF THE DRAWINGS

FIG. 10 is a flow diagram illustrating a method for manufacturing a skate shoe apparatus.

DETAILED DESCRIPTION OF THE INVENTION

Figure 1:
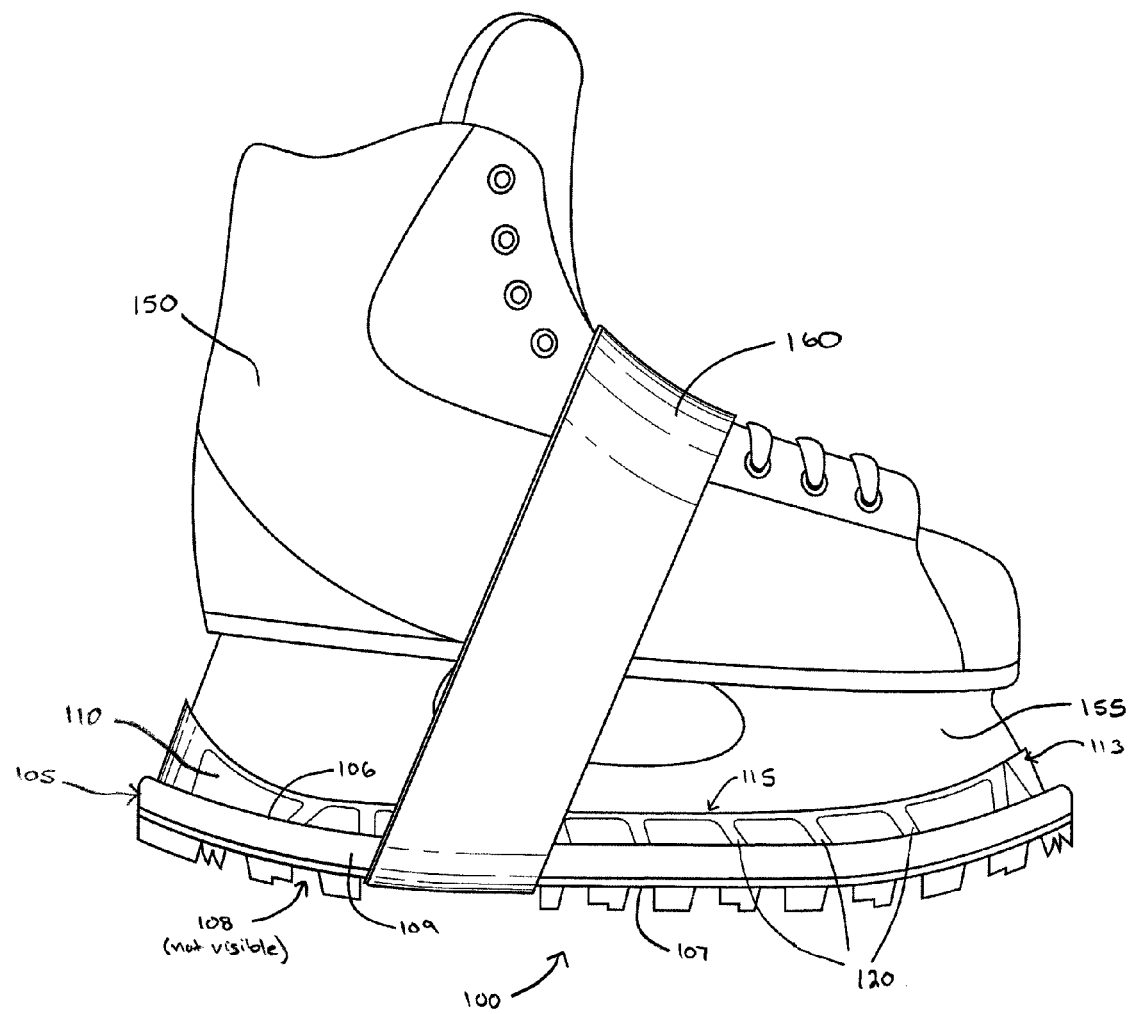
FIG. 1 is a diagram illustrating an example embodiment skate shoe apparatus attached to an ice skate with a strap.

FIG. 1 is a diagram illustrating an example embodiment skate shoe apparatus 100 attached to an ice skate 150 with a strap 160. The skate shoe apparatus 100 includes a base portion 105 having a top side 106, a bottom side 107, a left side 108 (not visible) and a right side 109. Extending from the top side 106 of the base portion 105 is a channel wall 110 defining a channel 115 to receive a blade 155 of the ice skate 150. Further, the skate shoe apparatus 100 includes a plurality of support members 120. The support members extend from an upper region 113 of the channel wall 110 to the top side 106 of the base portion 105. The support members provide support (e.g., lateral support) for the skate 150 received by the channel 115 and distribute lateral forces produced by the skate 150 across the base portion. These and other various elements of the example embodiment skate shoe apparatus 100 will be discussed in greater detail below.

The skate shoe apparatus 100 prevents damage to the blade 155 of the ice skate 150 when a skater wearing the ice skate 150 walks on non-ice surfaces (e.g., walking from a dressing area to the ice or across a parking lot to an arena).

FIGS. 2A-2D are side, top, bottom and cross-sectional views, respectively, of an example embodiment skate shoe apparatus 200. The skate shoe apparatus 200 includes a base portion 205 having a top side 206, a bottom side 207, a left side 208 and a right side 209. Extending from the top side 206 of the base portion 205 is a channel wall 210 defining a channel 215 to receive a lower travel surface of a skate (not shown) (e.g., blade 155 of the ice skate 150 of FIG. 1). Further, extending from an upper region 213 of the channel wall 210 to the top side 206 of the base portion 205 are a plurality of support members 220. Extending upward from an outer region 243a of the top surface 206 of the base 205 is a perimeter lip 217 providing additional rigidity to the base 205.

Figure 2A:
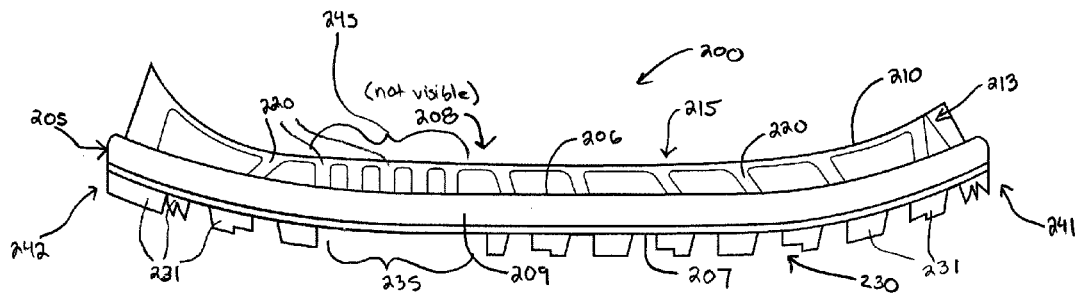
FIGS. 2A-2D are side, bottom, top and cross-sectional views, respectively, of an example embodiment skate shoe apparatus.
Figure 2C:
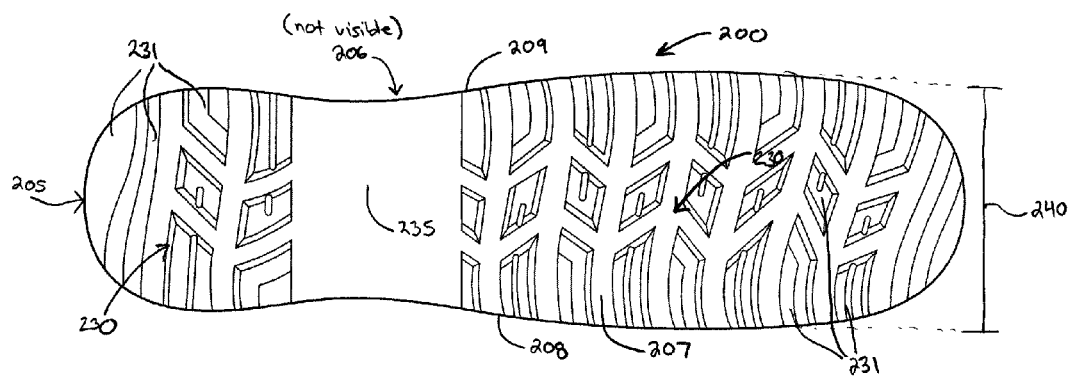
Figure 2B:
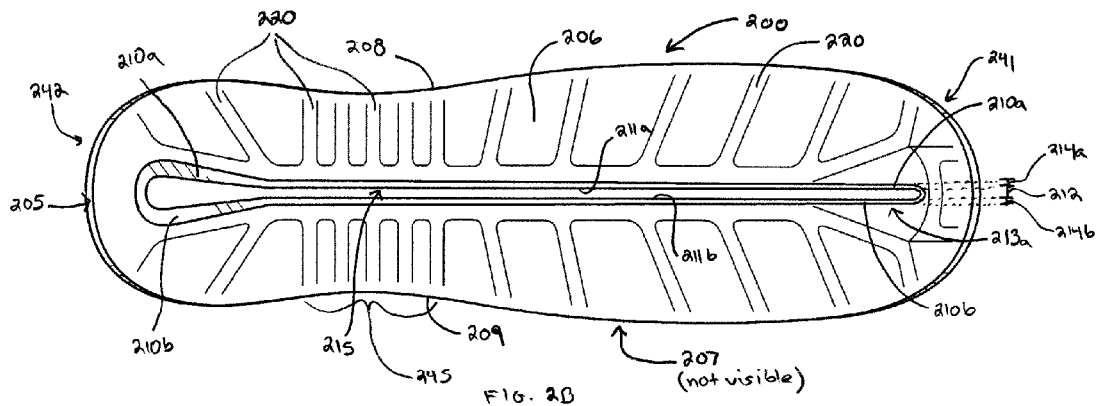

Further, as illustrated in greater detail in FIG. 2B, the channel wall 210 includes a left channel wall 210a and a right channel wall 210b. The left and right channel walls 210a, 210b have inner sides 211a, 211b, respectively, spaced apart at a distance 212 defining a slot 215 to receive the lower travel surface of the skate (not shown) (e.g., blade 155 of the ice skate 150 of FIG. 1). Further, the left and right channel walls 210a, 210b have thicknesses 214a, 215b, respectively, that provide lateral rigidity for the skate. As can be seen in greater detail, the perimeter lip 217 also has a thickness 218 that provides rigidity to the perimeter lip 217 and the base 205.

As shown in FIGS. 2A and 2B, a density of support members 220 may be greater at a center region 245 of the base portion 205. In this example embodiment, the increased density of support members 220 at the center region 245 provides additional rigidity of the base portion 205 at a region where an attachment device (not shown) (e.g., strap 160 of FIG. 1) attaches to the base portion 205. At this attachment region 245, greater forces are exerted on the base portion 205, thus causing an increased chance of deformity of the base portion 205. The additional support provided by the increased density of support members 220 counteracts these greater forces. Further, as shown in FIGS. 2A and 2B, the base portion 205 may be curved at a toe end 241 and a heel end 242 to provide a curved surface to walk on in a natural heel-to-toe manner.

As illustrated in greater detail in FIG. 2C, a tread 230, such as a plurality of lugs 231 with varied sizes, shapes and orientations, may be defined on the bottom side 207 of the base portion 205 to provide a gripping surface for traction of the base portion 205 on a ground surface (not shown). A gap 235 may be provided in the lugs 231 to accommodate an attachment device (not shown) (e.g., strap 160 of FIG. 1). The base portion 205 may have a width 240 that is substantially equivalent to the width of a boot of a skate (not shown) (e.g., skate 150 of FIG. 1). The base portion 205, channel wall 210 and tread 230 may be constructed from a common molded material and may be integrally formed with each other. Example materials include a rubberized material, a semi-flexible polymer material, and a solid material.

Figure 2D:
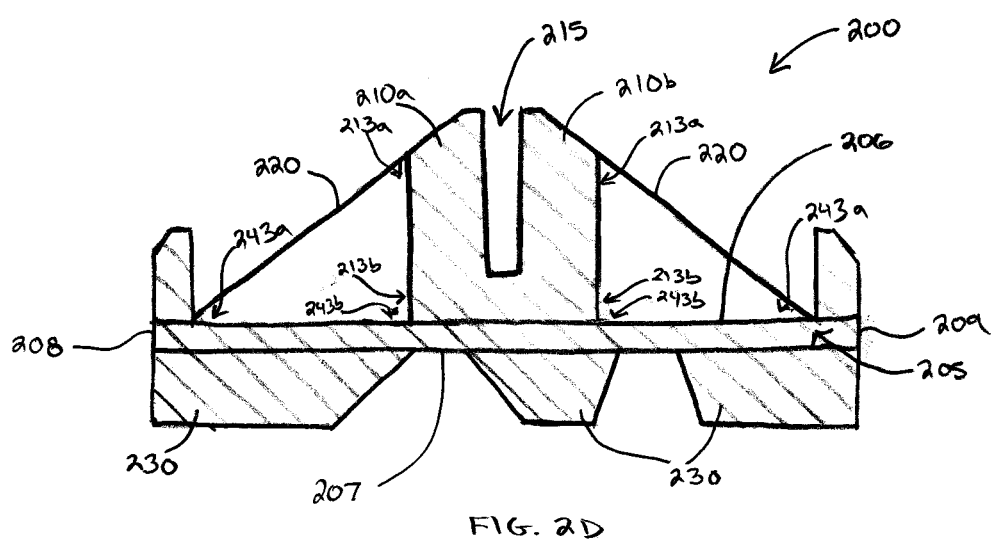

As illustrated in greater detail in FIG. 2D, the support members 220 may be triangularly shaped, such that the hypotenuse of a triangle formed by the support member 220 with the channel wall 210a, 210b and the base portion 205 extends from the upper region 213a of the channel wall 210a, 210b to an outer region 243a of the top surface 206 of the base portion 205. Further, the base of the triangle extends laterally along the top surface 206 of the base portion 205 from an intersection of a lower region 213b of the channel wall 210a, 210b and an inner region 243b of the top surface 206 of the base portion 205 to the outer region 243a of the top surface 206 of the base portion 205. Moreover, the height of the triangle extends along the channel wall 210a, 210b from the intersection of the lower region 213b of the channel wall 210a, 210b and the inner region 243b of the top surface 206 of the base portion 205 to the upper region 213a of the at least one channel wall 210a, 210b.

Figure 3A:
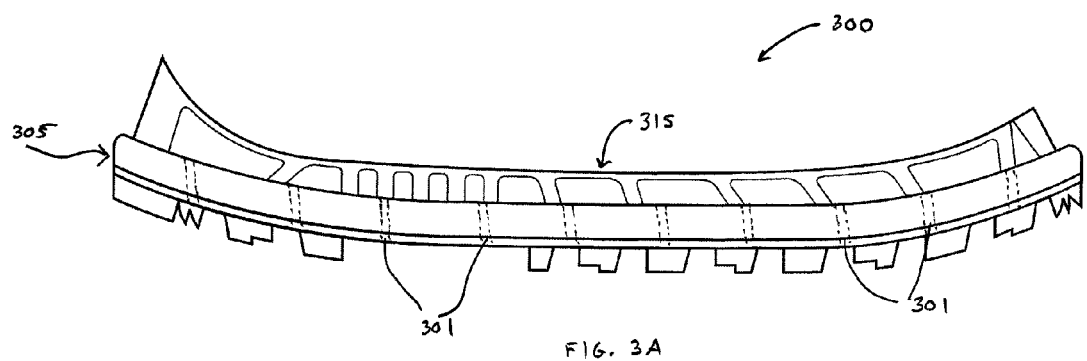
FIGS. 3A-3C are side, bottom and top views, respectively of an example embodiment skate shoe apparatus, similar to the embodiment illustrated in FIGS. 2A-2C, with drain holes through the base portion.
Figure 3B:
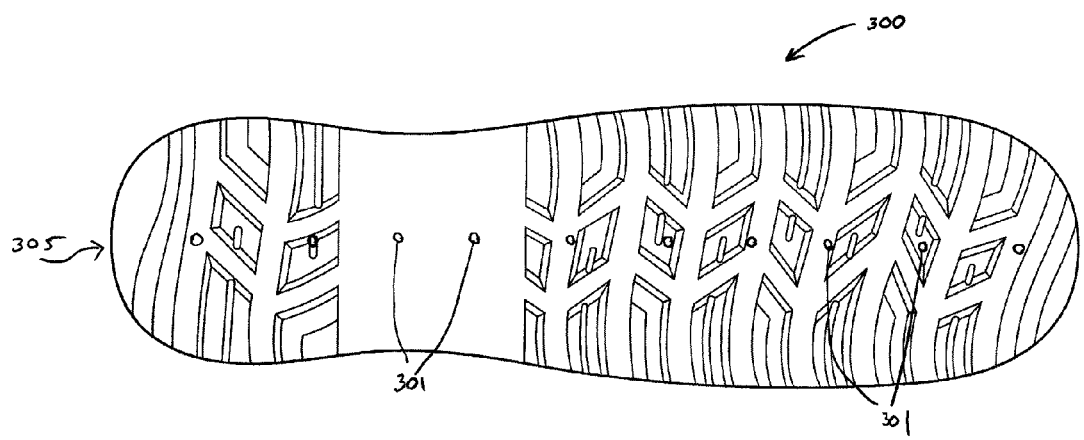
Figure 3C:
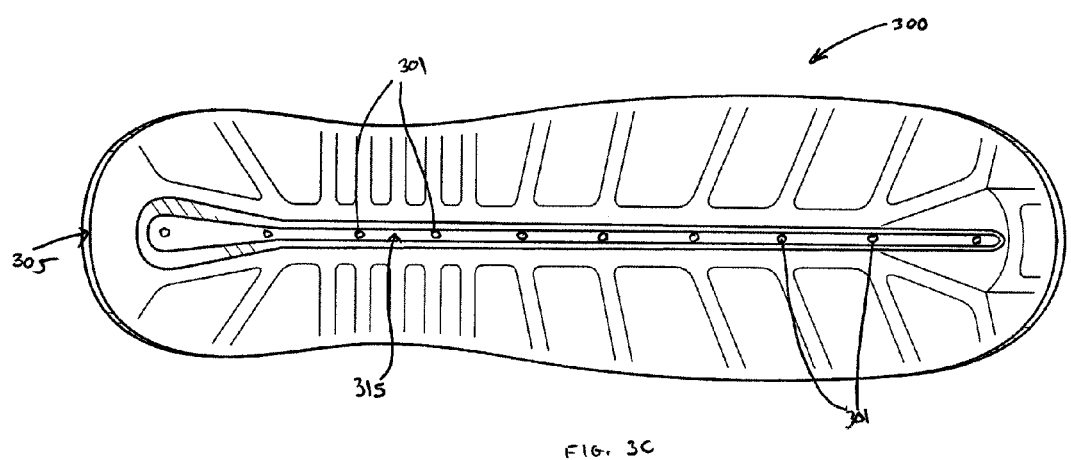

FIGS. 3A-3C are side, bottom and top views, respectively of an example embodiment skate shoe apparatus 300, similar to the embodiment illustrated in FIGS. 2A-2C, with drain holes 301 through a base portion 305. For ice skates, ice shavings tend to build up on the blade (not shown) (e.g., blade 150 of FIG. 1). When an ice skate is received by the slot 315, the ice shavings typically will begin to melt into liquid water. It is undesirable for the blade to be in contact with water because it will tend to rust, thereby dulling the blade's edge. Therefore, the drain holes 301 allow the liquid water, or other debris accumulated on the travel surface of the skate, to escape the slot 215, thereby preserving the integrity of the blade's edge. In other embodiments, grooves may be used in place of drain holes to allow water and debris to escape.

Figure 4:
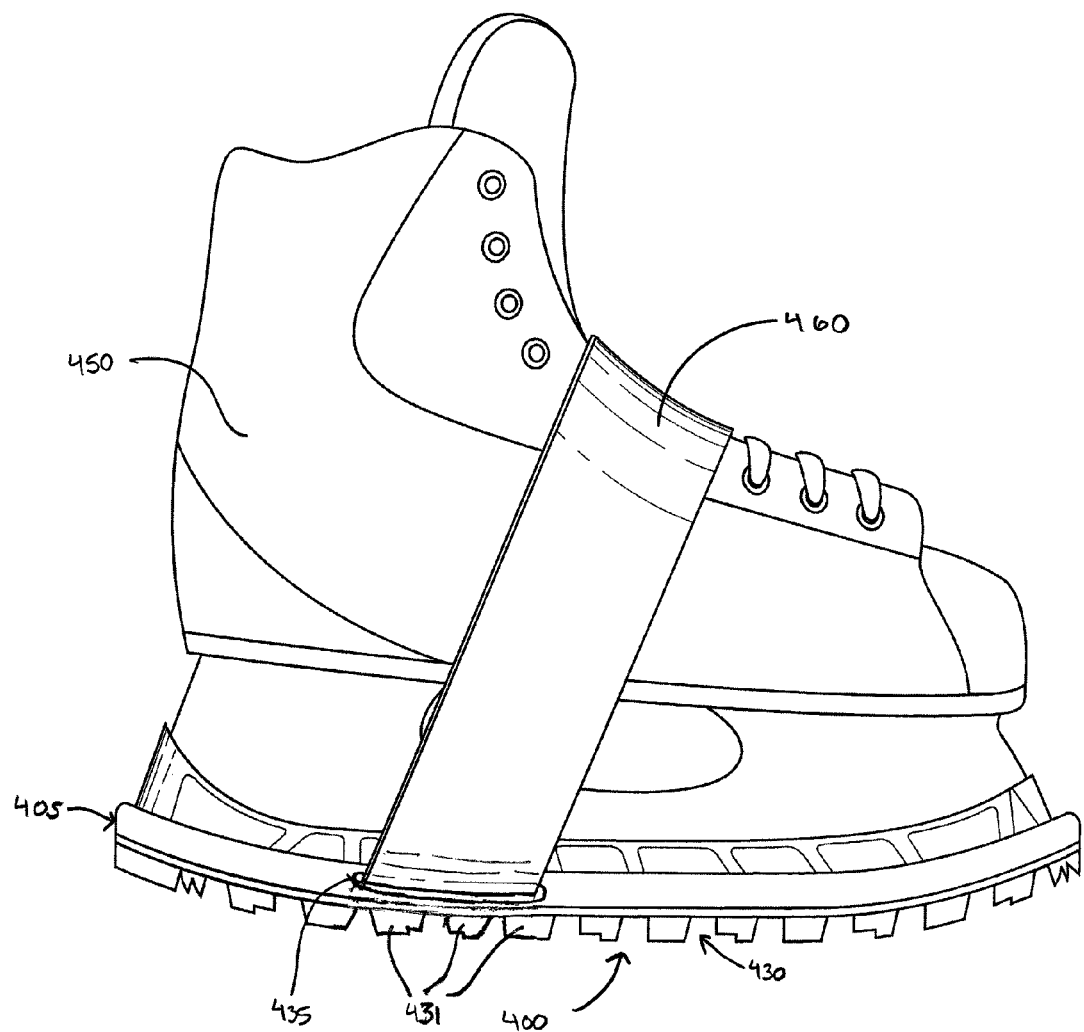
FIG. 4 is a diagram illustrating an example embodiment skate shoe apparatus attached to an ice skate with a strap passing through a slot in a base portion.

FIG. 4 is a diagram illustrating an example embodiment skate shoe apparatus 400 attached to an ice skate 450 with a strap 460 passing through a slot 435 in a base portion 405. By passing the strap 460 through the slot 435 in the base portion 405, additional traction lugs 431 may be defined on the tread 430 in a space on the bottom side 407 of the base portion 405 where a gap would be if the strap 460 passed under the bottom side 407 of the base portion 405 (e.g., gap 335 of FIG. 3). The additional lugs 431 provide added traction and support for the skate shoe apparatus 400 on a ground surface.

Figure 5:
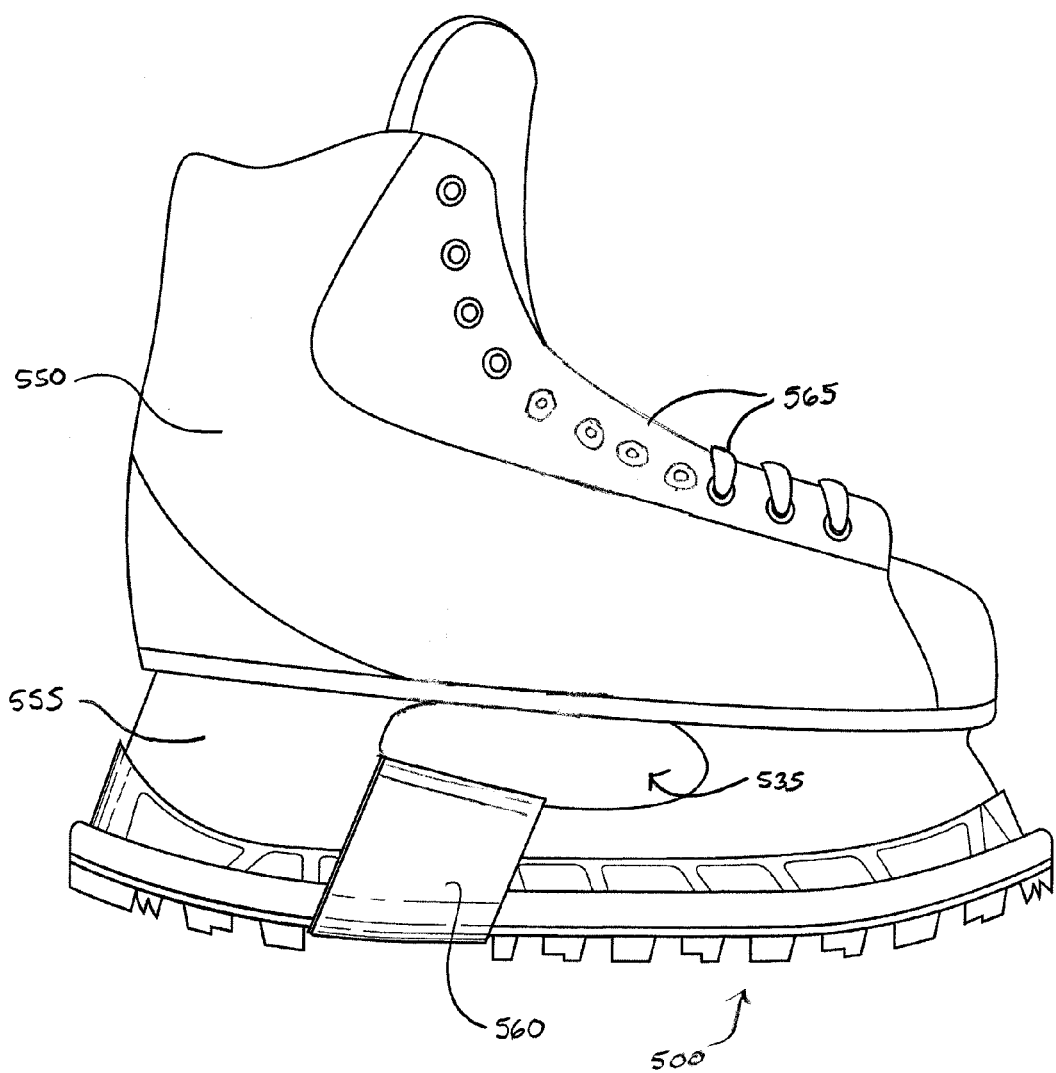
FIG. 5 is a diagram illustrating an example embodiment skate shoe apparatus attached to an ice skate with a strap passing through a hole in the ice skate blade.

FIG. 5 is a diagram illustrating an example embodiment skate shoe apparatus 500 attached to an ice skate 550 with a strap 560 passing through a hole 535 in the ice skate blade 555. By passing the strap 560 through the hole 535 in the skate blade 555, the length of strap 560 needed to attach the skate shoe apparatus 500 to the ice skate 550 is reduced. Further, by eliminating the traversal of the strap 560 over the laces 565 on the ice skate 550, it is possible for a skater to put on and remove the ice skate 550 with the skate shoe apparatus 500 attached to the ice skate 550 because the laces 565 are already exposed. This provides added benefits of decreasing dressing time and allowing the skate shoe apparatus 500 to remain on the skate blade 555 during additional times (e.g., walking to and from the ice, travel and storage times).

Figure 6:
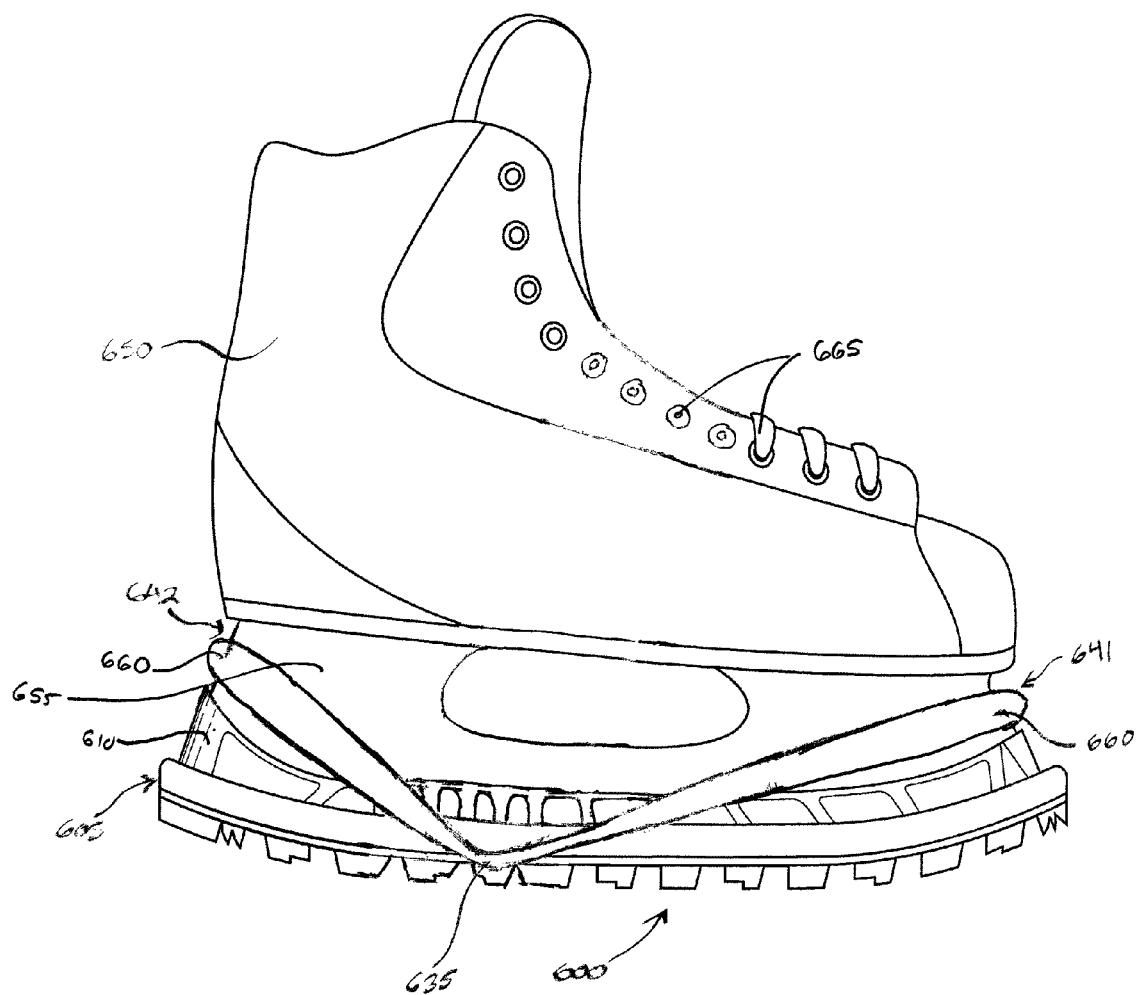
FIG. 6 is a diagram illustrating an example embodiment skate shoe apparatus attached to an ice skate with spring bands.

FIG. 6 is a diagram illustrating an example embodiment skate shoe apparatus 600 attached to an ice skate 650 with spring bands 660. The spring bands 660 extend over a toe end 641 and a heel end 642, respectively, of a blade 655 of the ice skate 650. The spring bands 660 attach to a base portion 605 of the skate shoe apparatus 600 at an attachment point 635. The spring bands 660 exert elastic forces against the toe end 641 and the heel end 642 to attach the skate shoe apparatus 600 to the skate 650. Further, by eliminating the traversal of a strap (not shown) (e.g., strap 160 of FIG. 1) over laces 665 on the ice skate 650, it is possible for a skater to put on and remove the ice skate 650 with the skate shoe apparatus 600 attached to the ice skate 650 because the laces 665 are already exposed. This provides added benefits of decreasing dressing time and allowing the skate shoe apparatus 600 to remain on the skate blade 655 during additional times (e.g., walking to and from the ice, travel and storage times). Further, the spring bands constructed from a common molded material and may be integrally formed with the base portion 605, the channel wall 610, and the tread 630.

Figure 7:
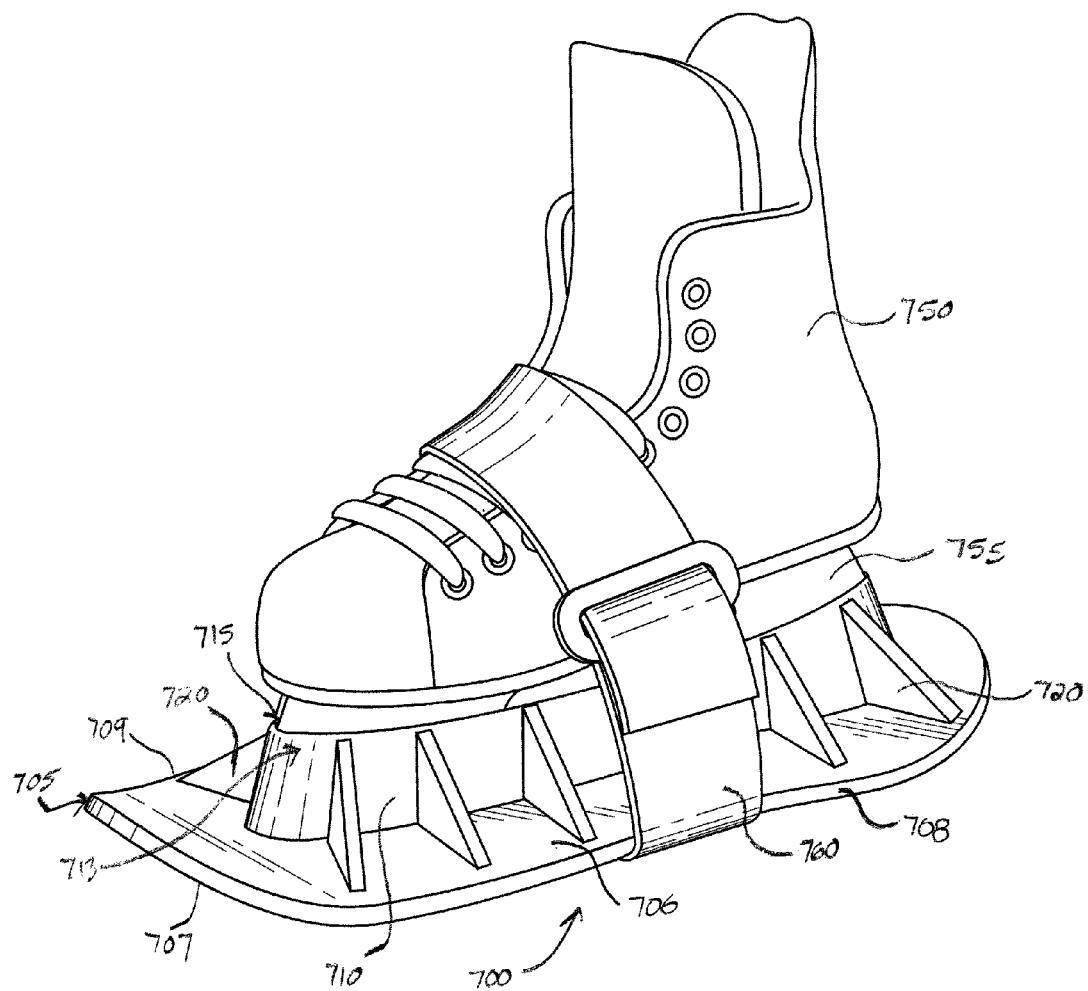
FIG. 7 is a diagram illustrating an alternate example embodiment skate shoe apparatus attached to an ice skate with a strap.

FIG. 7 is a diagram illustrating an alternate example embodiment skate shoe apparatus 700 attached to an ice skate 750 with a strap 760. The skate shoe apparatus 700 includes a base portion 705 having a top side 706, a bottom side 707, a left side 708 and a right side 709 (not visible). Extending from the top side 706 of the base portion 705 is a channel wall 710 defining a channel 715 to receive a blade 755 of the ice skate 750. Further, extending from an upper region 713 of the channel wall 710 to the top side 706 of the base portion 705 are a plurality of support members 720. The support members provide support (e.g., lateral support) for the skate 750 received by the channel 715 and distribute lateral forces produced by the skate 750 across the base portion 705.

Figure 8:
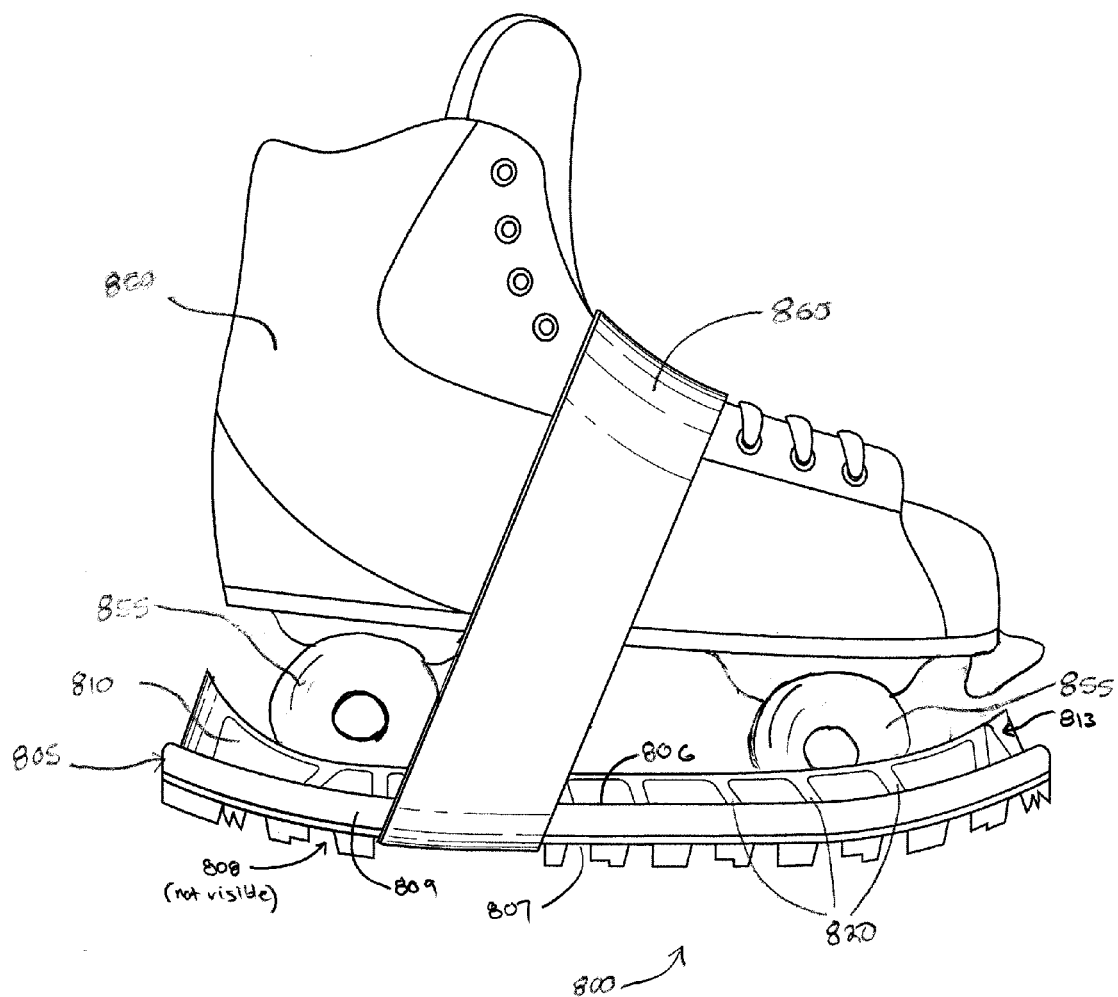
FIG. 8 is a diagram illustrating an example embodiment skate shoe apparatus attached to a traditional roller skate with a strap.

FIG. 8 is a diagram illustrating an example embodiment skate shoe apparatus 800 attached to a traditional roller skate 850 with a strap 860. The skate shoe apparatus 800 includes a base portion 805 having a top side 806, a bottom side 807, a left side 808 (not visible) and a right side 809. Extending from the top side 806 of the base portion 805 is a channel wall 810 defining a channel 815 to receive wheels 855 of the roller skate 850. Further, extending from an upper region 813 of the channel wall 810 to the top side 806 of the base portion 805 are a plurality of support members 820. The support members provide support (e.g., lateral support) for the skate 850 received by the channel 815 and distribute lateral forces produced by the skate 850 across the base portion 805.

Figure 9:
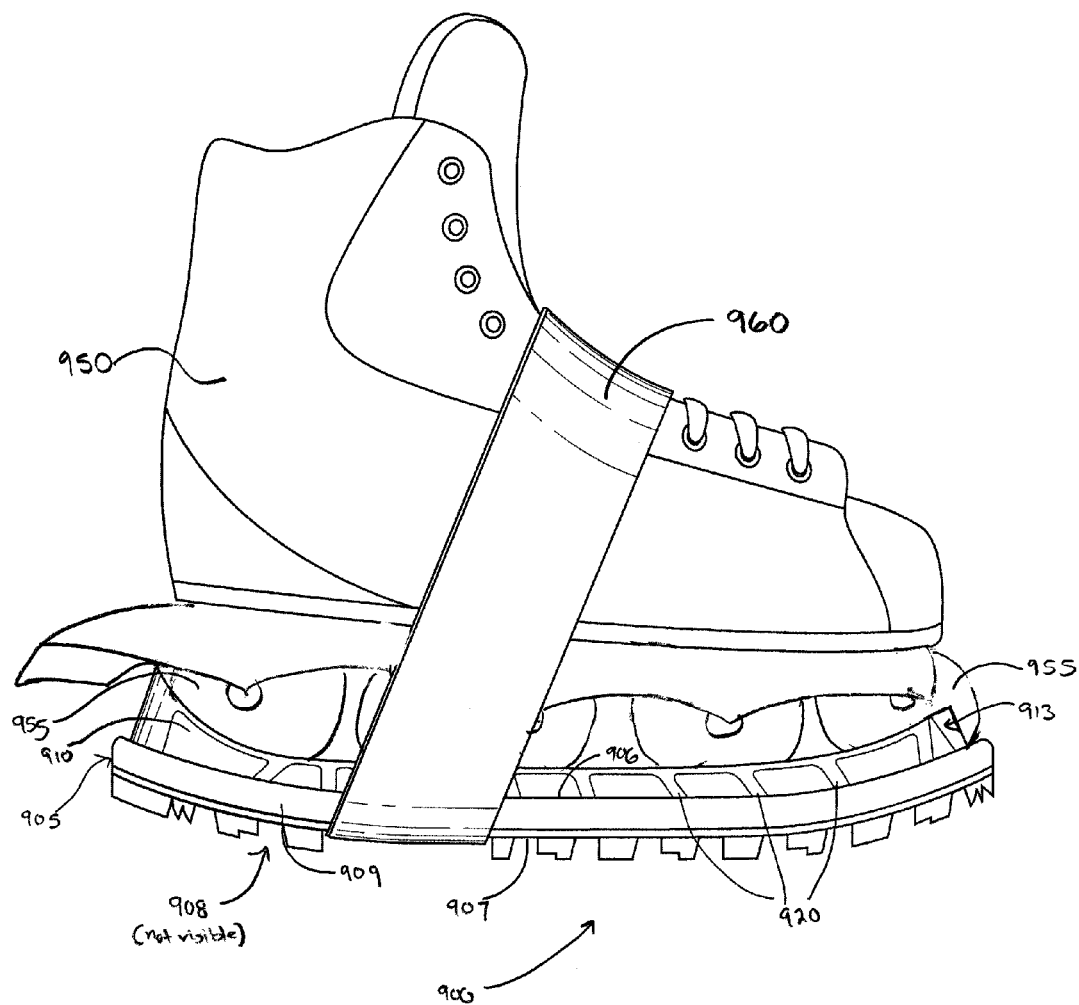
FIG. 9 is a diagram illustrating an example embodiment skate shoe apparatus attached to an inline skate with a strap.

FIG. 9 is a diagram illustrating an example embodiment skate shoe apparatus 900 attached to an inline skate 950 with a strap 960. The skate shoe apparatus 900 includes a base portion 905 having a top side 906, a bottom side 907, a left side 908 (not visible) and a right side 909. Extending from the top side 906 of the base portion 905 is a channel wall 910 defining a channel 915 to receive wheels 955 of the inline skate 950. Further, extending from an upper region 913 of the channel wall 910 to the top side 906 of the base portion 905 are a plurality of support members 920. The support members provide support (e.g., lateral support) for the skate 950 received by the channel 915 and distribute lateral forces produced by the skate 950 to the base portion 905.

FIG. 10 is a flow diagram 1000 illustrating a method for manufacturing a skate shoe apparatus. The method includes providing a skate shoe apparatus mold, the skate shoe apparatus mold for forming the skate shoe apparatus including a base portion having a top side, a bottom side, a left side and a right side, at least one channel wall extending from the top side of the base portion, the at least one channel wall defining a channel to receive a lower travel surface of a skate, and at least one support member extending from an upper region of the at least channel wall to the top surface of the base portion (1010) and molding a material into the mold to form the skate shoe apparatus (1020). Molding processes may include injection-molding and pouring a material in the mold.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A skate shoe apparatus, comprising:
   a base portion having a top side, a bottom side, a left side and a right side;
   at least one channel wall extending from the top side of the base portion, the at least one channel wall defining a channel to receive a lower travel surface of a skate; and
   at least one support member extending from an upper region of the at least channel wall to the top side of the base portion.
   wherein the at least one support member is triangularly shaped, such that the hypotenuse of a triangle formed by the support member with the least one channel wall and the base portion extends from the upper region of the at least one channel wall to an outer region of the top surface of the base portion, the base of the triangle extends laterally along the top surface of the base portion from an intersection of a lower region of the at least one channel wall and an inner region of the top surface of the base portion to the outer region of the top surface of the base portion, and the height of the triangle extends along the at least one channel wall from the intersection of the lower region of the at least one channel wall and the inner region of the top surface of the base portion to the upper region of the at least one channel wall.

2. The skate shoe apparatus of claim 1 further comprising a tread defined on the bottom side of the base portion, the tread providing a gripping surface for traction of the base portion on a ground surface.

3. The skate shoe apparatus of claim 2 further comprising a perimeter lip extending from an outer region of the top surface of the base.

4. The skate shoe apparatus of claim 3 wherein the base portion, the at least one channel wall, the perimeter lip and the tread are constructed from a common molded material and are integrally formed with each other, the combination of the base portion, the at least one channel wall, the perimeter lip and the tread providing rigidity to the skate shoe apparatus.

5. The skate shoe apparatus of claim 4 wherein the common molded material is constructed from at least one of a rubberized material, a semi-flexible polymer material, and a solid material.

6. The skate shoe apparatus of claim 1 wherein the base portion has a width that is substantially equivalent to the width of a boot of a skate.

7. The skate shoe apparatus of claim 1 wherein the at least one channel wall includes a left channel wall and a right channel wall, the left and right channel walls having inner sides spaced apart at a distance defining the slot to receive the lower travel surface of the skate.

8. The skate shoe apparatus of claim 1 wherein a thickness of the at least one channel wall provides lateral rigidity for the skate.

9. The skate shoe apparatus of claim 1 wherein a density of support members is greater at a center region of the base portion.

10. The skate shoe apparatus of claim 2 wherein the tread defined on the bottom side of the base portion includes lugs to provide added traction.

11. The skate shoe apparatus of claim 2 wherein the tread defined on the bottom side of the base portion is curved at a toe and a heel of the tread.

12. The skate shoe apparatus of claim 1 further comprising an attachment device for securing the skate shoe apparatus to a skate.

13. The skate shoe apparatus of claim 12 wherein the attachment device includes a strap.

14. The skate shoe apparatus of claim 13 wherein the strap passes through a slot in the base portion.

15. The skate shoe apparatus of claim 13 wherein the strap passes through a hole in the skate above the lower travel surface of the skate.

16. The skate shoe apparatus of claim 1 wherein the skate is an ice skate, a traditional roller skate or an inline skate.

17. A method of manufacturing a skate shoe apparatus, the method comprising:
providing a skate shoe apparatus mold, the skate shoe apparatus mold for forming the skate shoe apparatus including a base portion having a top side, a bottom side, a left side and a right side, at least one channel wall extending from the top side of the base portion, the at least one channel wall defining a channel to receive a lower travel surface of a skate, and at least one support member extending from an upper region of the at least one channel wall to the top side of the base portion, wherein the at least one support member is triangularly shaped such that the hypotenuse of a triangle formed by the support member with the at least one channel wall and the base portion extends from the upper region of the at least one channel wall to an outer region of the top surface of the base portion, the base of the triangle extends laterally along the top surface of the base portion from an intersection of a lower region of the at least one channel wall and an inner region of the top surface of the base portion to the outer region of the top surface of the base portion, and the height of the triangle extends along the at least one channel wall from the intersection of the lower region of the at least one channel wall and the inner region of the top surface of the base portion to the upper region of the at least one channel wall; and
molding a thermoplastic material into the mold to form the skate shoe apparatus.

\* \* \* \* \*